(12) United States Patent
Major et al.

(10) Patent No.: US 9,093,884 B2
(45) Date of Patent: Jul. 28, 2015

(54) INTEGRATED MOTOR AND CONTROL

(75) Inventors: Michael W. Major, Moro, IL (US); Gregory A. Peterson, South Barrington, IL (US)

(73) Assignee: Nidec Motor Corporation, St. Louis, MO (US)

( * ) Notice: Subject to any disclaimer, the term of this patent is extended or adjusted under 35 U.S.C. 154(b) by 1287 days.

(21) Appl. No.: 12/908,539

(22) Filed: Oct. 20, 2010

(65) Prior Publication Data

US 2012/0096902 A1 Apr. 26, 2012

(51) Int. Cl.
*H02K 5/10* (2006.01)
*H02K 5/18* (2006.01)
*H02K 11/00* (2006.01)
*D06F 37/20* (2006.01)
*D06F 37/30* (2006.01)

(52) U.S. Cl.
CPC .......... *H02K 11/0073* (2013.01); *D06F 37/206* (2013.01); *D06F 37/304* (2013.01); *H02K 5/18* (2013.01); *Y02B 40/52* (2013.01)

(58) Field of Classification Search
CPC ...................................................... H02K 5/10
USPC .......................................... 310/85, 88–89, 87
See application file for complete search history.

(56) References Cited

U.S. PATENT DOCUMENTS

| 4,668,898 | A | * | 5/1987 | Harms et al. ............. 318/400.21 |
| 6,114,790 | A | | 9/2000 | Fei |
| 6,291,912 | B1 | * | 9/2001 | Nadir et al. ..................... 310/64 |
| 6,636,011 | B2 | | 10/2003 | Sadasivam |
| 6,704,202 | B1 | * | 3/2004 | Hamaoka et al. ............. 361/704 |
| 6,828,751 | B2 | | 12/2004 | Sadasivam |
| 7,342,344 | B2 | * | 3/2008 | Lee ......................... 310/216.044 |
| 7,352,092 | B2 | | 4/2008 | Levine |
| 2004/0109295 | A1 | | 6/2004 | Major et al. |
| 2006/0179895 | A1 | | 8/2006 | Thorn |
| 2007/0063603 | A1 | | 3/2007 | Levine et al. |
| 2008/0174213 | A1 | | 7/2008 | Peterson et al. |
| 2008/0203846 | A1 | | 8/2008 | Hoemann |
| 2009/0289513 | A1 | * | 11/2009 | Vadillo et al. .................... 310/62 |
| 2011/0010961 | A1 | | 1/2011 | Wehrheim et al. |

OTHER PUBLICATIONS

International Search Report, PCT Application No. PCT/US2011/048482 dated Mar. 6, 2012.
Written Opinion of the International Searching Authority, PCT Application No. PCT/US2011/048482 dated Mar. 6, 2012.
Exhibit A, Photos of a motor, admitted prior art, 5 pages.
Exhibit B, Photos of another motor, admitted prior art, 4 pages.
Exhibit C, Photos of another motor, admitted prior art, 5 pages.

* cited by examiner

*Primary Examiner* — Burton Mullins
(74) *Attorney, Agent, or Firm* — Senniger Powers LLP

(57) ABSTRACT

An integrated motor and control system has an electric motor. A control controls operation of the motor. A housing substantially covers at least two sides of the control. The housing has an opening and a liquid guide for guiding liquid toward a predetermined position in the opening to prevent liquid from contacting the control. The control is mounted on at least one of the electric motor and the housing. A heat sink can be extended through the opening in the housing to cool the control. The liquid guide can facilitate natural convection over the portion of the heat sink exterior of the housing. The integrated motor and control system can suitably be used in a washing machine or other appliance where liquid may be encountered.

22 Claims, 12 Drawing Sheets

INTEGRATED MOTOR AND CONTROL

BACKGROUND

The present invention generally relates to an integrated motor and control system, and more particularly to an integrated electric motor and control system protected by a housing having an opening through which a heat sink extends.

Electric motors are commonly used in appliances, such as clothes washing machines, clothes dryers, and the like. It is common for a motor control to be mounted on the motor to control various aspects of motor operation, such as motor speed. The electric motor control is commonly at least partially enclosed in a housing to protect the motor and control. For example, in some appliances it is possible for the motor or its control to encounter liquid (e.g., water from condensate or wet clothes). The housing can prevent the liquid from contacting the motor control, protecting electronic components of the control from liquid. An electric motor and control can be provided to an appliance assembly line as an integrated unit to facilitate assembly of the appliance. For example, the motor control can be connected to and mounted on the motor by a motor manufacturer who may also attach a protective housing to protect the motor control.

Although it is desirable to protect the motor control from exposure to water or other liquids, it is also desirable to cool the motor control to prevent its heat-sensitive components from overheating. Cooling is commonly accomplished by mounting a heat sink in thermal communication with the control. As is generally known, a heat sink commonly has a body including a relatively large thermal mass to absorb heat. Some heat sinks have cooling fins extending from the body to facilitate heat transfer from the heat sink away from the control and/or motor. The cooling fins can more effectively transfer heat away from the control when the fins are outside the housing protecting the motor control where cooler air is available to pass over the fins. An opening can be provided in the housing to allow the fins to extend outside the housing. Although such an opening is desirable for cooling, the opening can permit liquid to get into the housing and contact the control. In appliances in which it is foreseeable that water or other liquids may be present, a drip shield can be positioned to extend over the top of the opening and the cooling fins to divert the liquid away from the opening. However, the drip shield can also undesirably interfere with cooling air flow over the fins.

SUMMARY

The present invention relates to an integrated motor and control system. The system has an electric motor and control for controlling operation of the motor. A housing substantially covers at least two sides of the control. The housing has an opening and a liquid guide for guiding liquid toward one or more positions in the opening selected so liquid guided by the liquid guide into the opening is shed away from the opening to limit contact between the liquid and the control. The control is mounted on at least one of the electric motor and the housing.

Another aspect of the invention is an integrated motor and control system including an electric motor and a control mounted on the motor for controlling operation of the motor. A heat sink is adjacent the control for cooling the control. A housing substantially covers at least two sides of the control. The housing has an opening sized for exposing at least a portion of the heat sink to an environment outside the housing. The housing has a liquid guide for guiding liquid toward the heat sink.

Yet another aspect of the invention is an appliance including a rotatably mounted drum. An electric motor is operatively connected to the drum for rotating the drum. A control is mounted on the motor for controlling operation of the motor. A housing substantially covers at least two sides of the control. The housing has an opening. A heat sink extends through the housing opening and is mounted on the control for cooling the control. A liquid guide extends along the housing for guiding liquid toward the opening and over the heat sink.

In another aspect of the invention, an appliance has a rotatably mounted drum. An electric motor is operatively connected to the drum for rotating the drum. A control is mounted on the motor for controlling operation of the motor. A housing substantially covers at least two sides of the control. The housing has a front and a side. A rib projects from the front of the housing adjacent the side to limit movement of liquid from the front of the housing onto the side of the housing. The housing has an opening in the front. A heat sink extending through the housing opening and is mounted on the control for cooling the control.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

Figure 1:
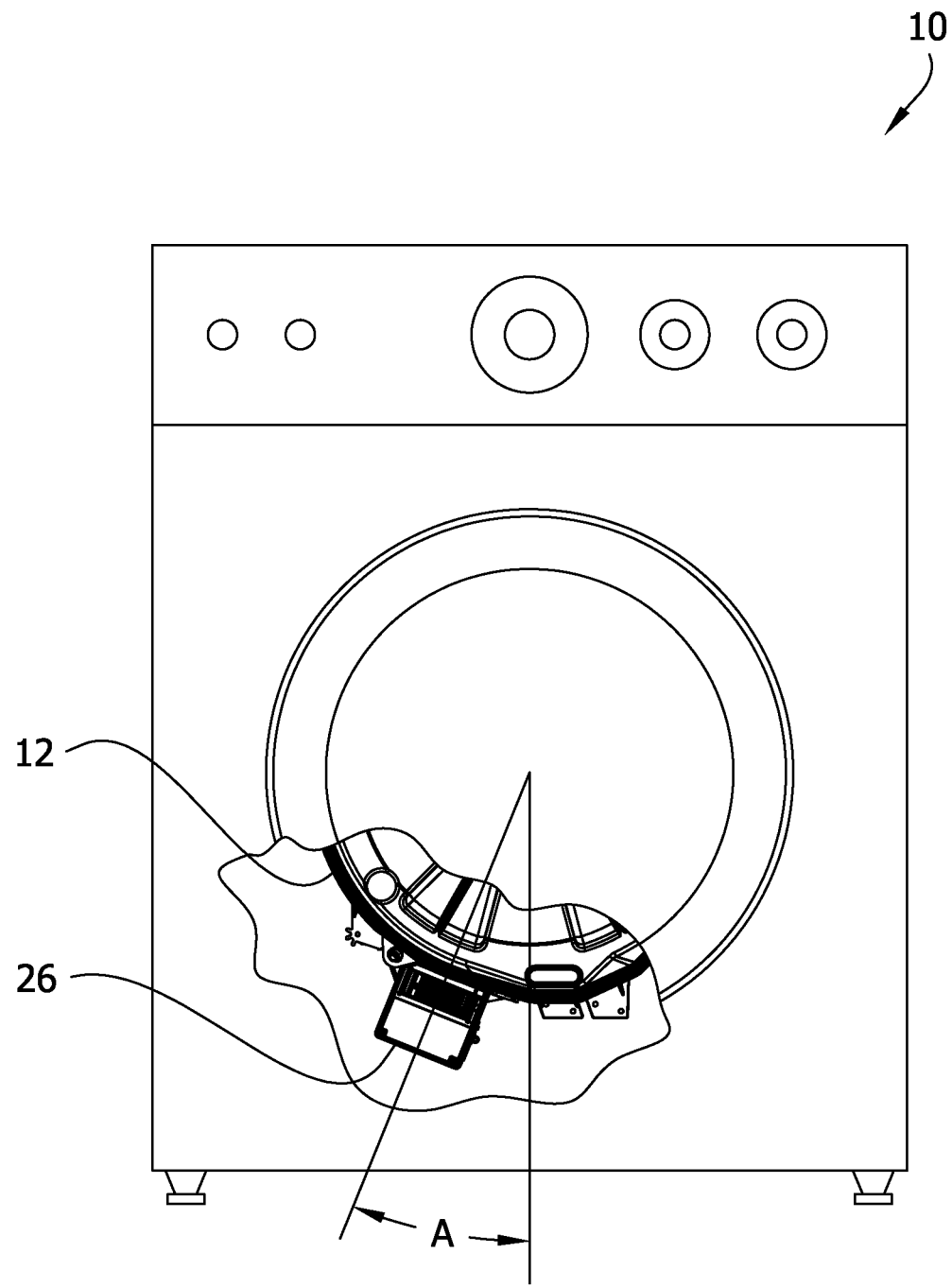
FIG. 1 is a front elevation of one embodiment of an appliance having an integrated motor and motor control system.
Figure 2:
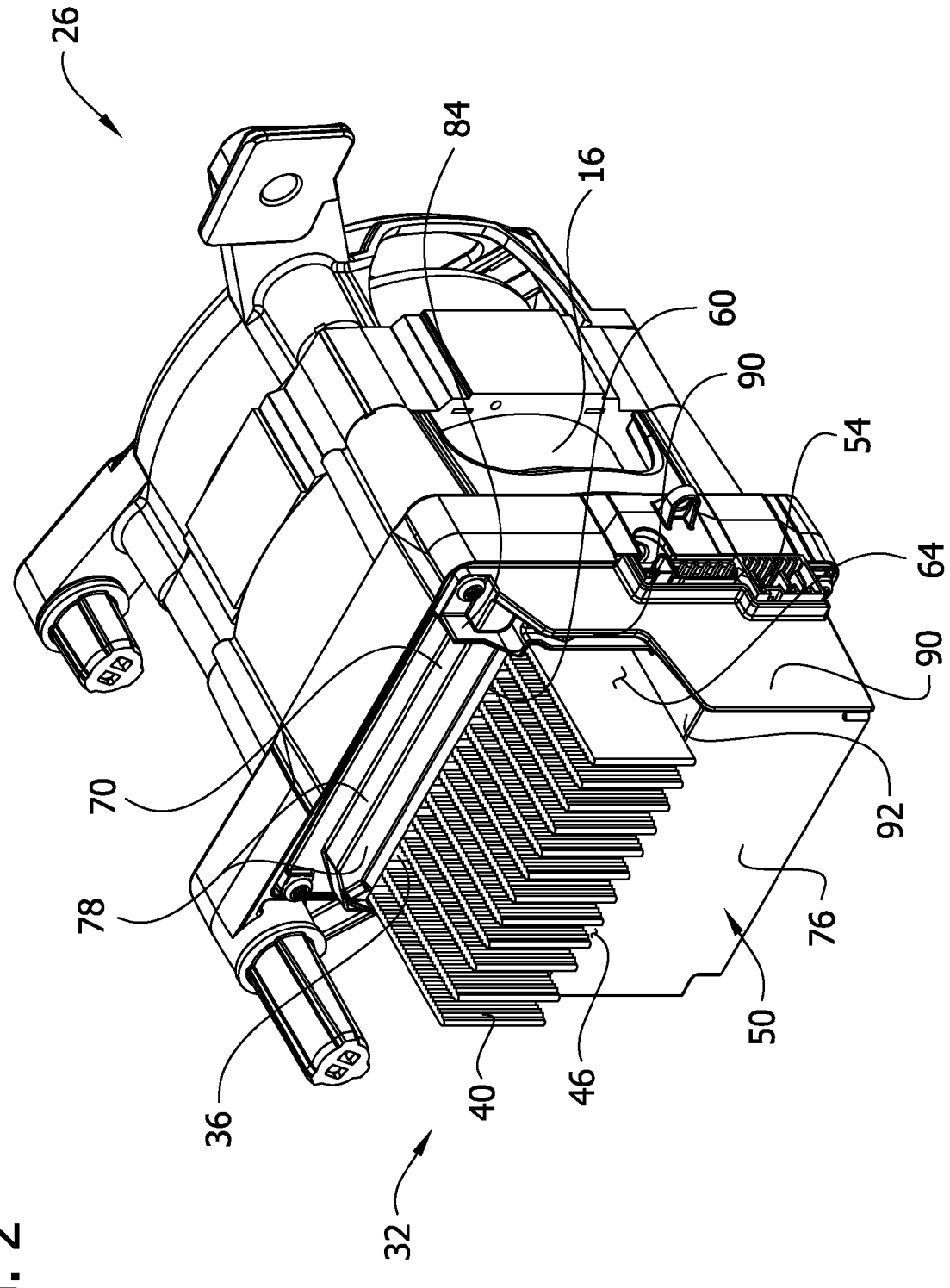
FIG. 2 is a perspective of the integrated motor and motor control system.
Figure 3:
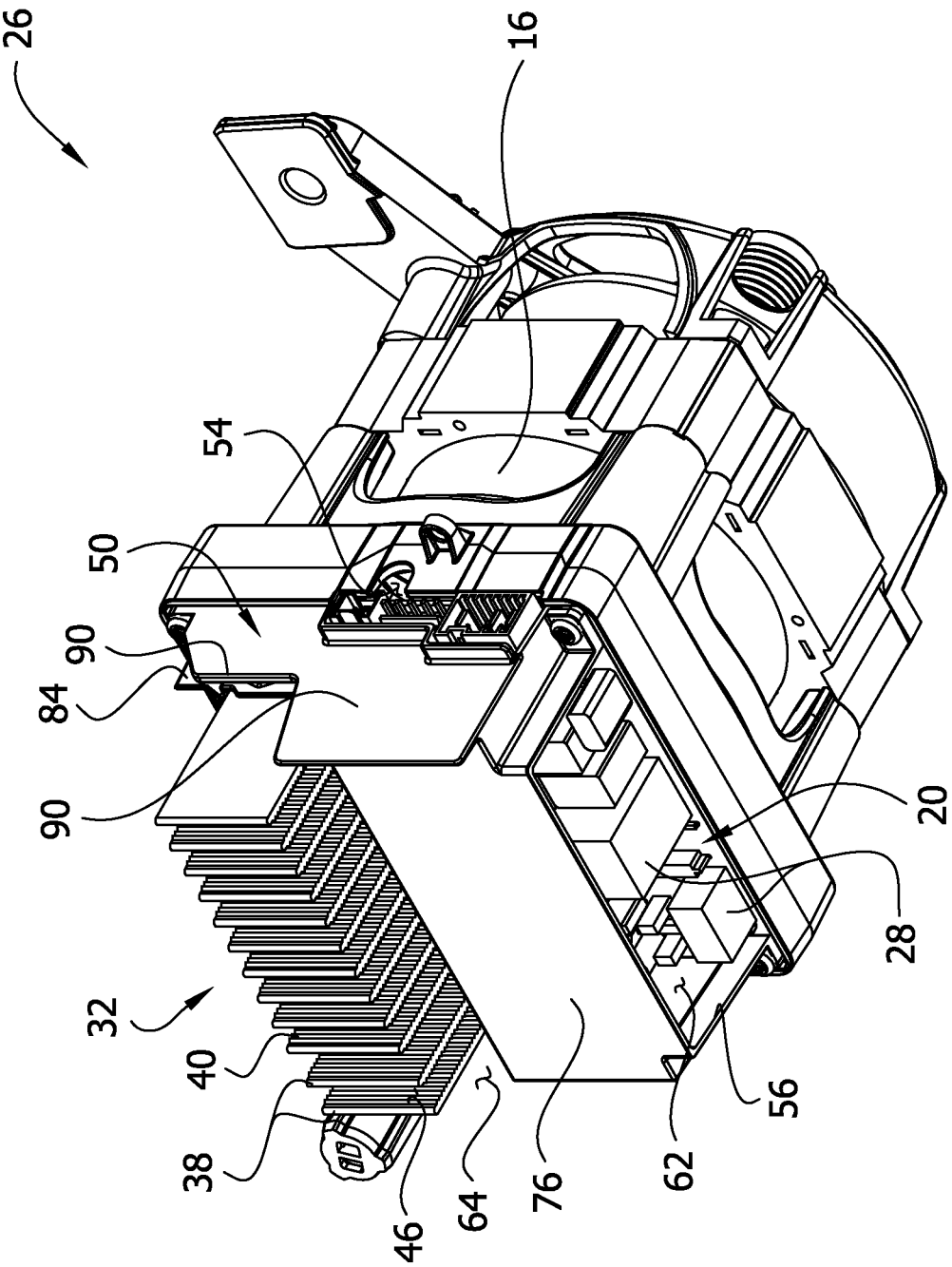
FIG. 3 is another perspective of the integrated motor and motor control system.

Referring to FIG. 1, one embodiment of an appliance is designated generally by the reference number 10. As illustrated in FIG. 1, the appliance 10 is a laundry machine for laundering clothes and has a rotatably mounted washing machine drum 12 for holding clothes, water, detergent, and other laundry materials during a wash cycle. An electric motor 16 is operatively connected to the drum 12 for selectively rotating the drum. The motor 16 in the illustrated embodiment is mounted so at least a portion of the drum 12 is above the motor. The motor 16 in this embodiment is mounted in an orientation so the motor axis is substantially horizontal. The motor 16 is connected to a motor control 20 adapted to control one or more aspects of motor operation. Referring to FIGS. 2-7, the motor 16 and control 20 are provided as an integrated motor and control system 26. The motor control 20 is mounted on the electric motor 16, either directly or indirectly, for controlling operation of the motor. Various fasteners and other mounting systems known to those skilled in the art can be used to mount the motor control 20 on the motor 16. Although the integrated motor and control system 26 is illustrated in the drawings as part of a washing machine, it is understood the integrated motor and control system can be used in other appliances within the scope of the invention. Moreover, the integrated motor and control system 26 can be by itself within the scope of the invention.

The electric motor 16 is suitably an asynchronous electric induction motor, although other types of electric motors can be used without departing from the scope of the invention. The control 20 includes various electronic components 28 (FIG. 3) adapted to control one or more aspects of motor operation. Some of the components 28 of the control 20 are sensitive to and may be damaged by contact by water or other liquids. Also, some of the components 28 of the control 20 are sensitive to or may be damaged by high heat. The particular electronic components of the control, and the functions performed by the control, will vary depending on the particular type of electric motor. For example, the control can suitably be adapted to supply multiphase AC power to an induction motor for controlling speed and/or other aspects of motor operation. Some of the many possible motor controls are described in detail in U.S. Pat. Nos. 7,352,092; 6,828,751; 6,636,011; 6,114,790 and U.S. Patent Application Publications 2008/0203846 and 2006/0179895, the entire contents of which are hereby incorporated by reference. Those skilled in the art will also be familiar with many other motor controls that are suitable for controlling various electric induction motors or other electric motors.

Figure 4:
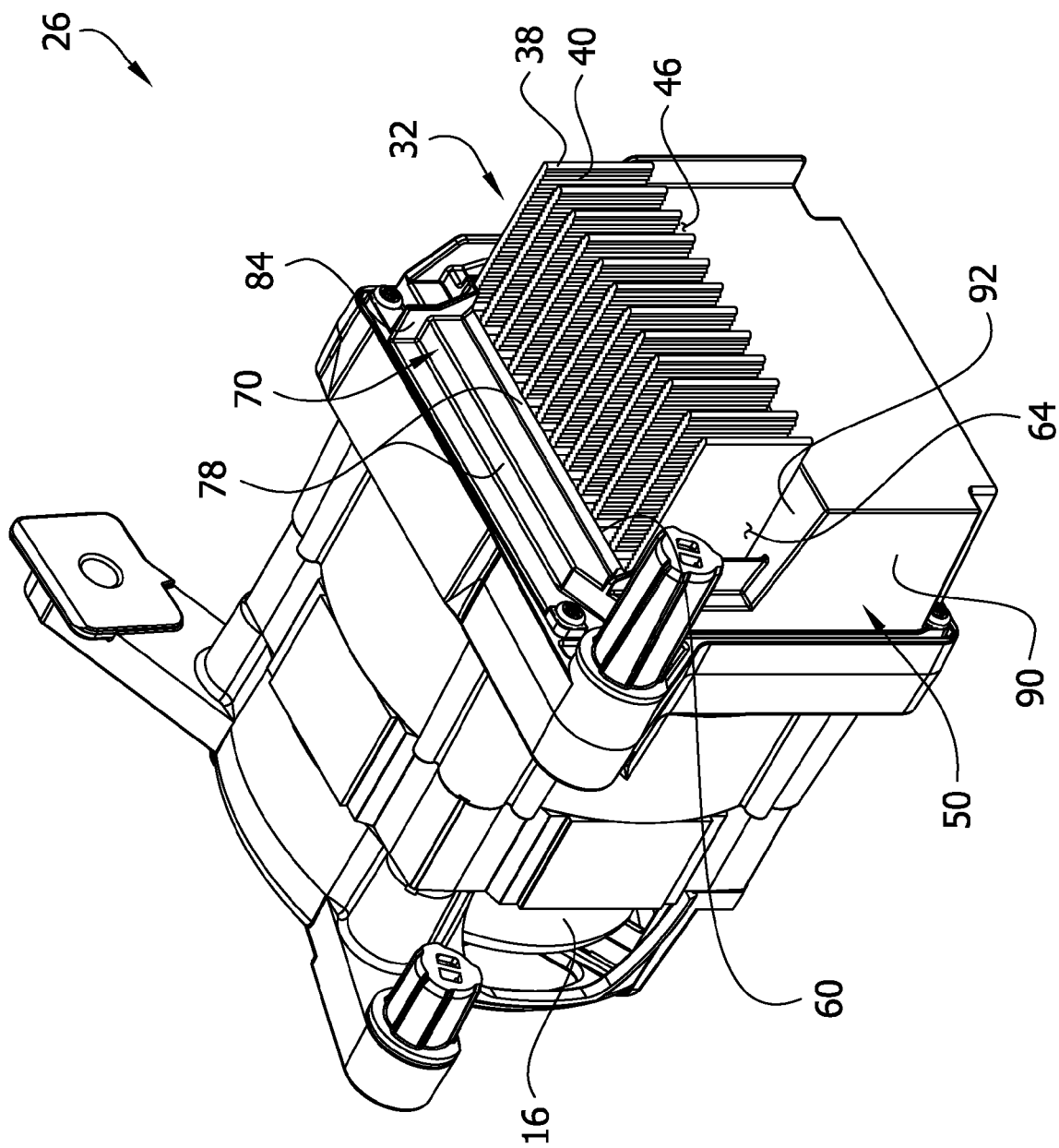
FIG. 4 is another perspective of the integrated motor and motor control system.
Figure 5:
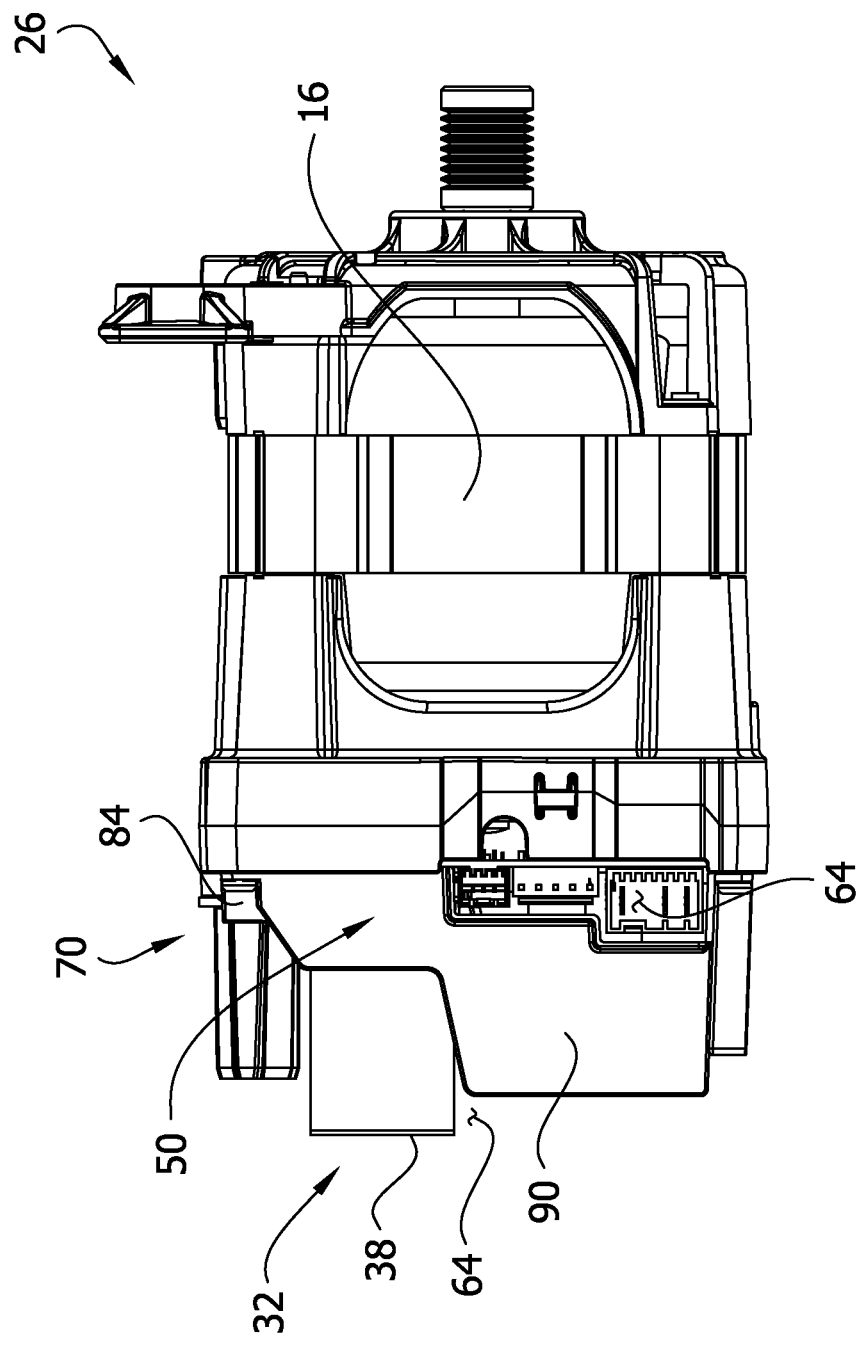
FIG. 5 is a side elevation of the integrated motor and motor control system.
Figure 6:
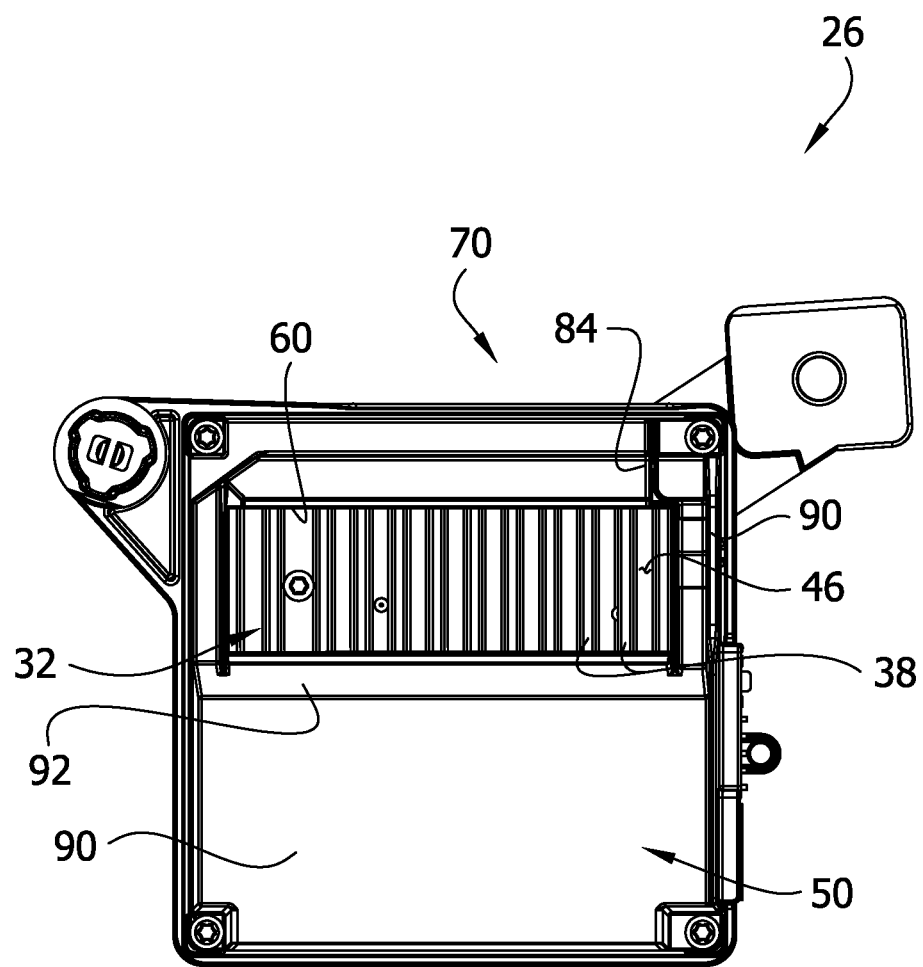
FIG. 6 is a front elevation of the integrated motor and motor control system.
Figure 7:
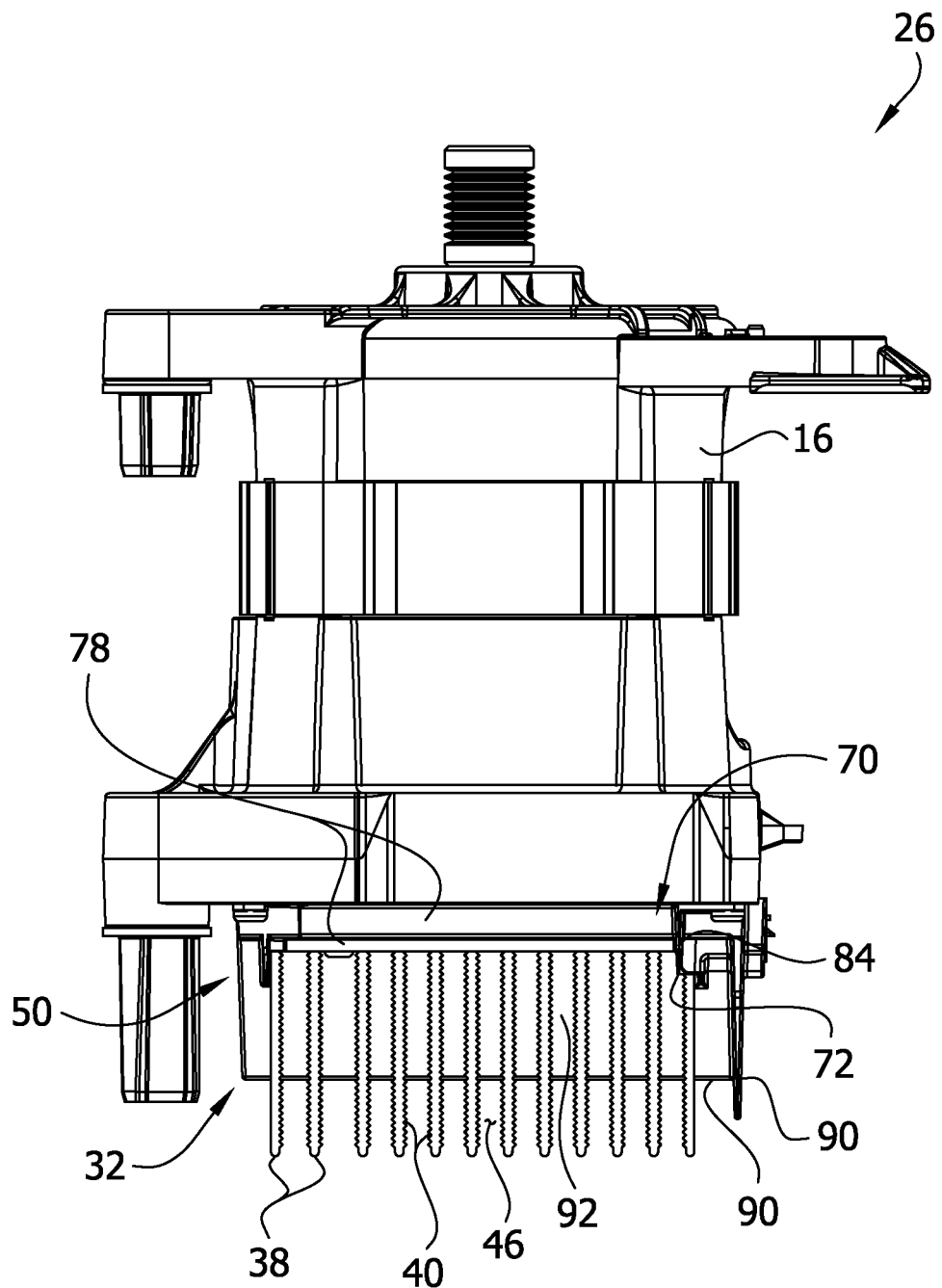
FIG. 7 is a top plan of the integrated motor and motor control system.
Figure 8:
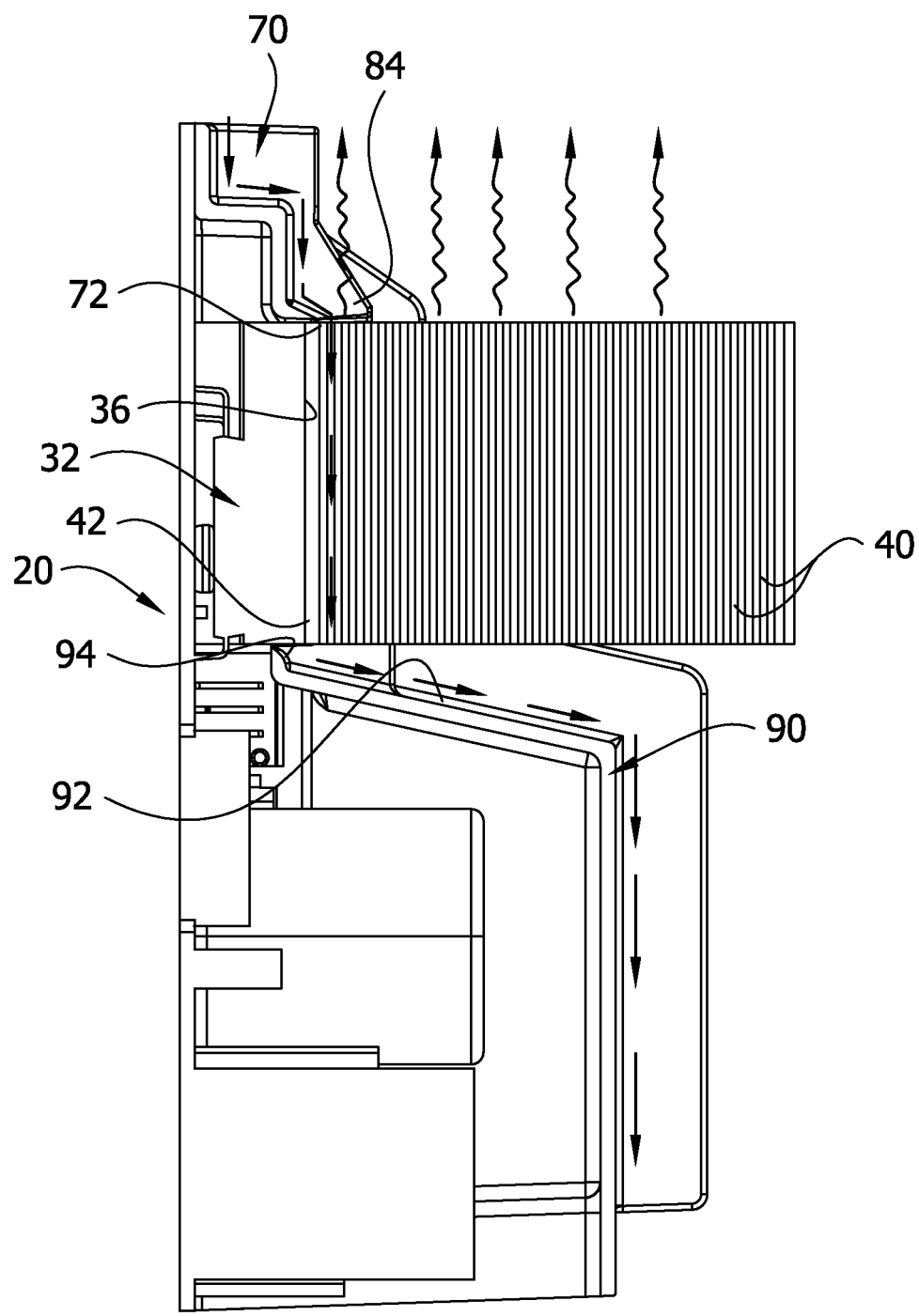
FIGS. 8 and 9 are schematic diagrams, illustrating operation of a liquid guide of the integrated motor and motor control system.
Figure 9:
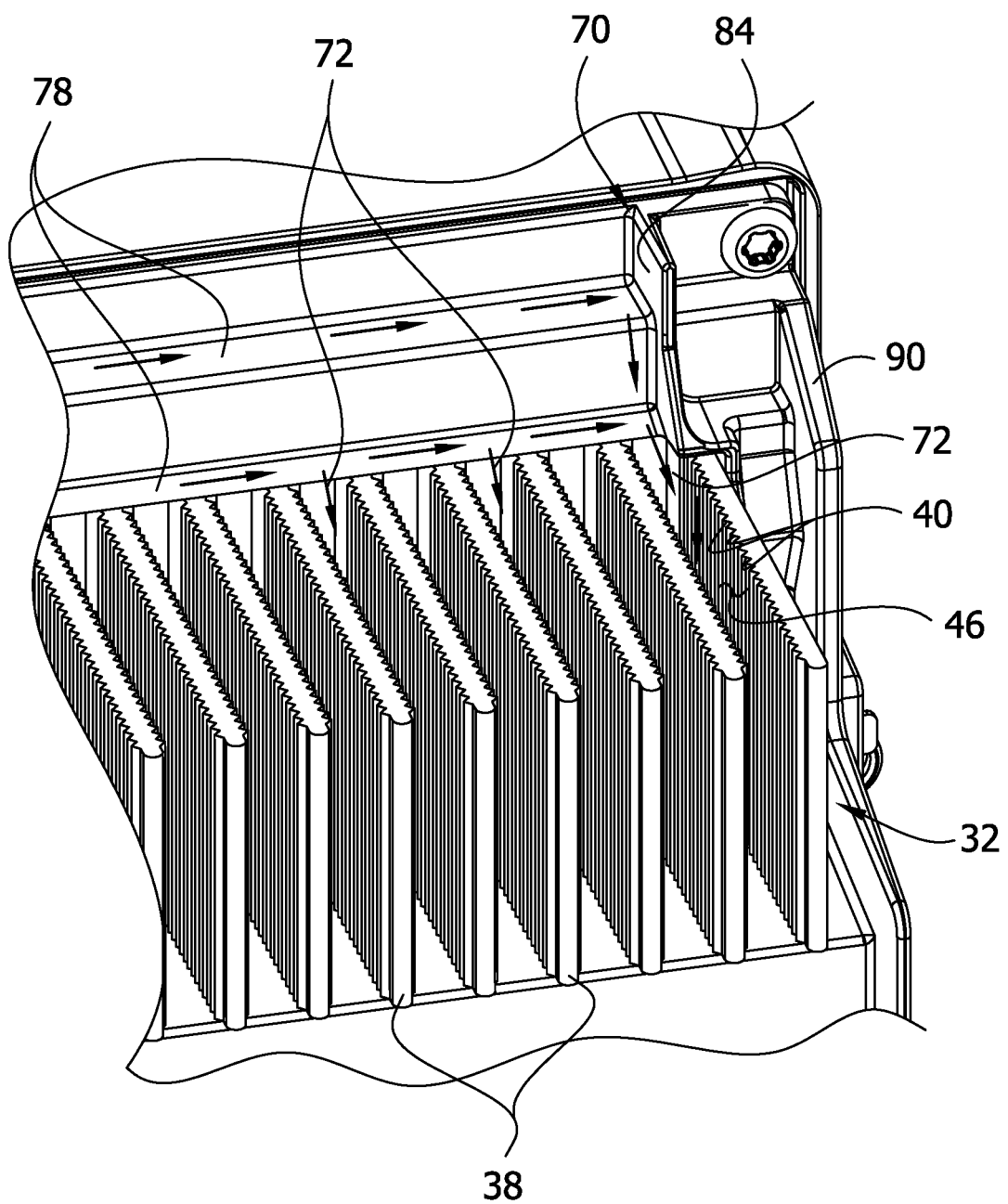

A heat sink 32 is directly or operatively mounted on the control 20 for cooling the control. The heat sink 32 includes a base 36 (FIG. 8) made of a thermally conductive material, such as aluminum, adjacent the control 20. The base 36 is constructed to have a relatively high thermal mass so it has the capacity to absorb a relatively high amount of heat. As illustrated in FIGS. 4 and 9, the heat sink 32 includes a plurality of fins 38 extending from the base 36. Each fin 38 is a relatively thin rectangular plate made of thermally conductive material extending from one side of the heat sink base 36. The fins 38 have corrugated surfaces on each side formed by a plurality of parallel grooves 40 extending substantially parallel to the surface of the heat sink base 36 from which the fins extend. One advantage of the grooves 40 is they provide increased surface area for each fin 38 to facilitate heat transfer from the fins. The fins 38 have relatively smooth flat surfaces 42 adjacent the heat sink base 36. The grooves 40 are spaced from the heat sink base 36 by the smooth flat surfaces 42. The fins 38 are generally parallel to one another and are separated by open spaces 46 between the fins. The heat sink 32 is suitably a unitary structure, as illustrated, but can include multiple parts that are made separately and assembled.

A housing 50 is mounted on the motor 16, either directly or indirectly. The control 20 can be mounted on the housing 50 instead of or in addition to being mounted on the motor 16. Various fasteners and other mounting systems known to those skilled in the art can be used to mount the housing 50 on the motor 16. The housing 50 covers and at least partially encloses the motor control 20. For instance, the housing 50 illustrated in the drawings substantially covers at least two sides of the control 20. In particular, the housing 50 extends over the top of the motor control 20 and also over a plurality of sides of the motor control. The housing 50 can be made of any suitable material, such as plastic or metal. The housing 50 illustrated in the drawings has several openings. One of the openings 54 is sized and shaped to receive one or more plugs (not shown) or other suitable connectors for electrically connecting the motor control 20 to a component, such as a power supply (not shown), that is outside the housing 50. Another opening 56 is in the bottom of the housing 50 to help ventilate and cool the housing. The housing 50 also includes a heat sink opening 60. As illustrated in FIG. 8, the base 36 of the heat sink 32 is contained within the housing 50 and the fins 38 extend through the opening 60 from the interior 62 of the housing to its exterior 64 where the heat sink fins are exposed to and contacted by air or other fluid.

The integrated motor and motor control system 26 includes a liquid guide 70 extending along the housing for guiding liquid (represented by straight arrows in FIGS. 8 and 9) toward the heat sink opening 60 and over the heat sink 32. The liquid guide 70 is positioned so it is generally above the opening 60 when the integrated motor and motor control system 26 is mounted on the appliance 10. The liquid guide 70 suitably directs the liquid from an exterior surface of the housing 50 toward one or more positions 72 in the heat sink opening 60 and on the heat sink 32 selected so the heat sink sheds liquid guided by the liquid guide away from the heat sink opening 60 to limit entry of liquid into the housing through the heat sink opening. Accordingly, the liquid guide 70 limits (e.g., prevents) contact between the liquid it guides into the opening 60 and the control 20. Whether or not any particular position in the opening is suitable for receiving liquid from the liquid guide will depend on the geometry and orientation of the particular integrated motor/motor control system because the orientation and the shape of the housing and heat sink can affect the path of the liquid.

As illustrated in FIGS. 2, 4, 6, and 8, the heat sink opening 60 is in the upper portion of a front wall 76 of the housing 50, which has a generally vertical orientation when the system 26 is mounted as illustrated in FIG. 1. The distal edges of fins 38 are roughly vertical when the system 26 is mounted in this orientation. As used herein the phrases "roughly vertical" and "roughly vertically" mean a particular feature is either vertical or tilted no more than about 45 degrees from vertical. For example, the roughly vertical fins 38 are tilted at an angle A in FIG. 1 suitably in the range of about 0 degrees to about 45 degrees from vertical, more suitably about 5 degrees to about 45 degrees from vertical, still more suitably about 15 degrees to about 30 degrees from vertical, and still more suitably about 20 degrees to about 25 degrees from vertical (e.g., about 22.5 degrees from vertical). Further, when the system 26 is mounted in the orientation illustrated in FIG. 1, a portion of the housing 50 defining the top of the heat sink opening 60 is inclined (e.g., by the same angle A discussed above) toward one side of the heat sink opening. As illustrated in FIG. 9, for instance, there are two stepped surfaces 78 on the housing 50 at the top of the heat sink opening 60. The surface 78 closest to the heat sink opening 60 extends over the spaces 46 between the fins 38. The base 36 is recessed within the housing 50. The fins 38 extend from the recessed surface of the heat sink base 36 through the heat sink opening 60 to the exterior 64 of the housing. Liquid on the surfaces 78 at the top of the heat sink opening 60 will flow along these surfaces toward the lower end of the heat sink opening 60. Some liquid may fall from the surfaces 78 toward the heat sink opening 60, as illustrated in FIG. 9, in which case the liquid will fall or flow into the spaces 46 between the fins 38 and into the grooves 40 on the cooling fin 38. The locations 72 receiving liquid from the liquid guide 72 are spaced outward on the fins 38 from the recessed surface of the heat sink base 36. The grooves 40 will guide any liquid downward to the bottom of the cooling fin and keep it from entering the housing 50 through the heat sink opening 60, as illustrated in FIG. 8.

The liquid guide 70 includes a barrier 84 positioned to intercept flow of liquid along the surfaces 78 of the housing 50 at the upper edge of the heat sink opening 60 before the liquid reaches the lower side of the heat sink 32. The barrier 84 is suitably formed integrally with the rest of the housing 50, as illustrated in the drawings. However, the barrier 84 can be formed separately and secured to a housing within the scope of the invention. As illustrated in FIG. 9, the barrier forms a wall that prevents liquid flowing along the surfaces 78 at the top of the heat sink opening 60 from continuing in this direction. The barrier 84 diverts any liquid flow into the space 46 between the outermost fin 38 at the lower side of the heat sink 32 and its neighboring fin. Liquid diverted by the barrier 84 flows or falls into one or more of the grooves 40 on the cooling fin 38 and is directed downward along the fin to the bottom of the cooling fin as described above.

The housing 50 includes a protruding portion 90 positioned below the heat sink opening 60. As illustrated in FIG. 8, the heat sink 32 directs liquid toward the protruding portion 90. In particular, the cooling fins 38 and the grooves 40 thereon, guide the liquid to the bottom of the cooling fins 38. The liquid falls from the bottom of the cooling fins 38 on the protruding portion 90 of the housing 50. The protruding portion 90 of the housing has a sloped upper surface 92 that directs the liquid away from the heat sink opening 60, the motor 16, and the motor control 20. The protruding portion 90 of the housing 50 includes a ramp 94 (FIG. 8) at the opening 60 that is steeper than the sloped upper surface 92 and positioned to limit the possibility that liquid falling from the bottom of the fins 38 onto the protruding portion 90 of the housing 50 can flow into the housing at the bottom of the opening. The ramp 94 has a slope that is steeper than the slope of the sloped upper surface 92 of the housing away from the heat sink opening 60.

One advantage of the liquid guide 70 is that it guides liquid into the heat sink opening 60 in a controlled manner such that the heat sink 32 guides liquid away from the heat sink opening, facilitating use of a housing 50 that includes an opening sized for exposing at least a portion of the heat sink to an environment outside the housing without using a drip shield or other structure to prevent water or other liquid from entering the heat sink opening. Accordingly, there is substantially no barrier to air or other fluid heated by the cooling fins rising, as illustrated by wavy arrows in FIG. 8, thereby establishing a natural convective flow over the cooling fins 38 that enhances the efficiency of the cooling fins 38 at transporting heat away from the motor 16 and/or motor control 20.

The housing 50 also has a rib 90 (FIG. 9) projecting forward from the front of the housing adjacent the lower side of the housing. The rib 90 extends along the side of the housing from the top of the housing toward the bottom (e.g., all the way from the top to the bottom) along the intersection of the front and side of the housing. The rib 90 guides any liquid on the front of the housing 50 adjacent the side toward the bottom of the housing and helps limit movement of liquid from the front of the housing 50 around the corner onto the side of the housing. The rib 90 limits the possibility that liquid from the front of the housing 50 could flow or other wise move from the front of the housing around the corner to the side and either enter the housing through the opening 54 provided for the electrical connections or come into contact with any plugs or other connectors at this opening.

Figure 10:
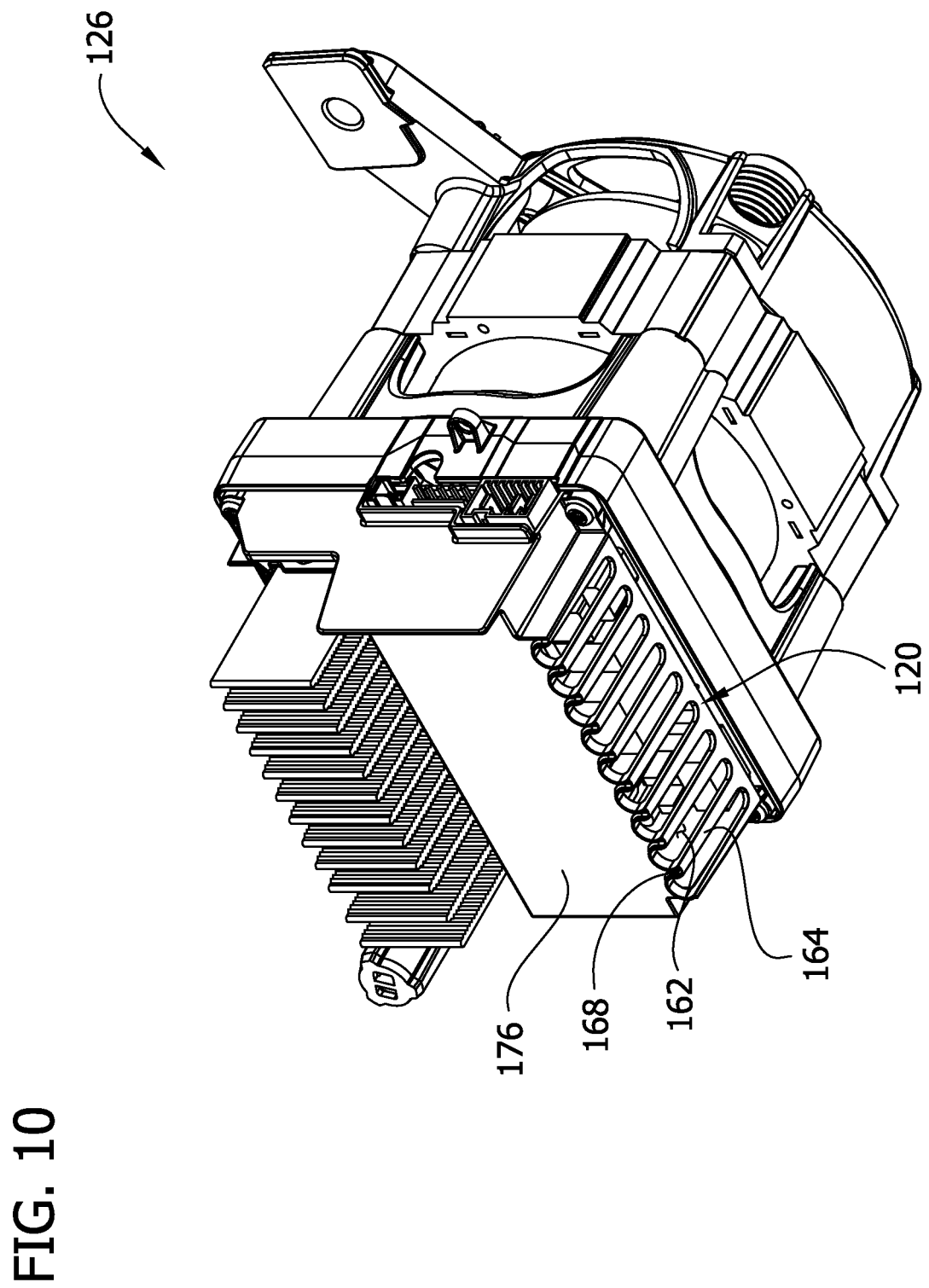
FIG. 10 is a perspective of another embodiment of an integrated motor and motor control system.
Figure 11:
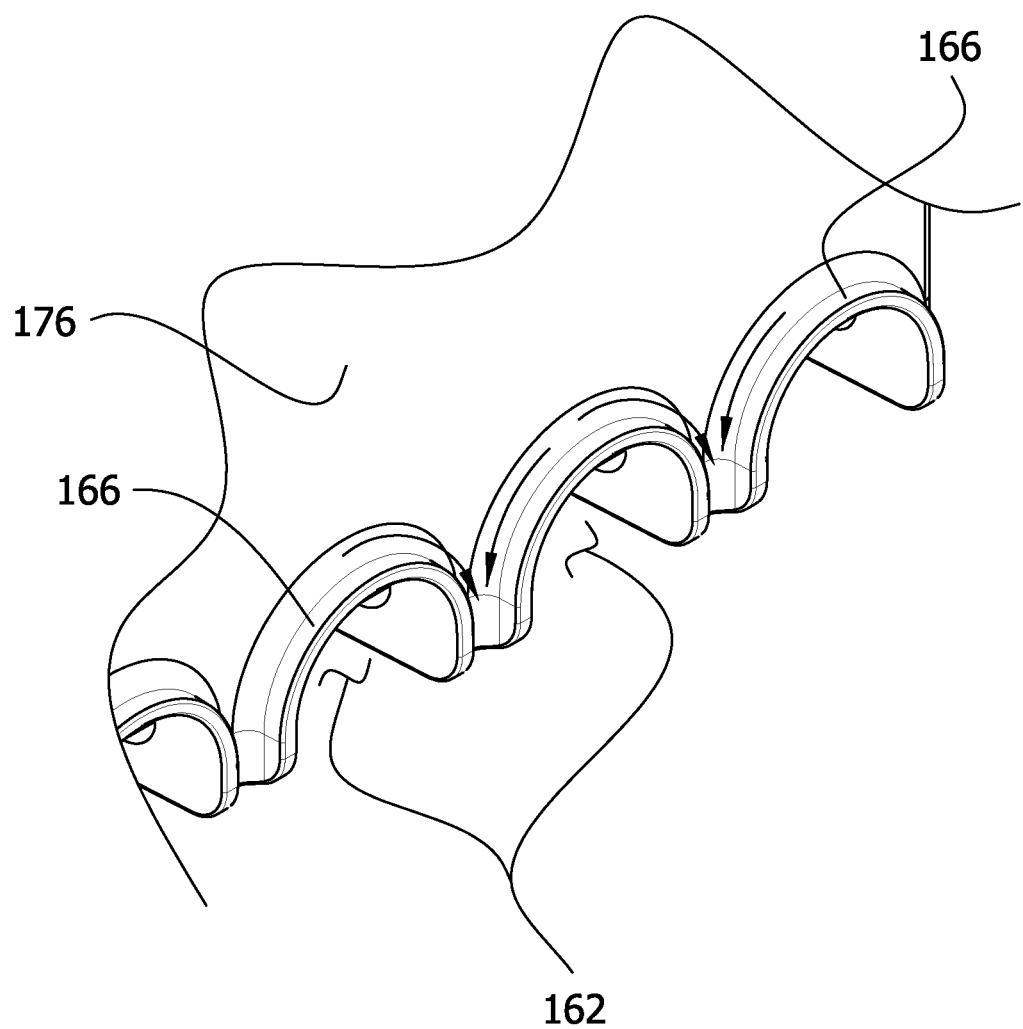
FIG. 11 is an enlarged fragmentary perspective view of part of the housing of the system illustrated in FIG. 10.
Figure 12:
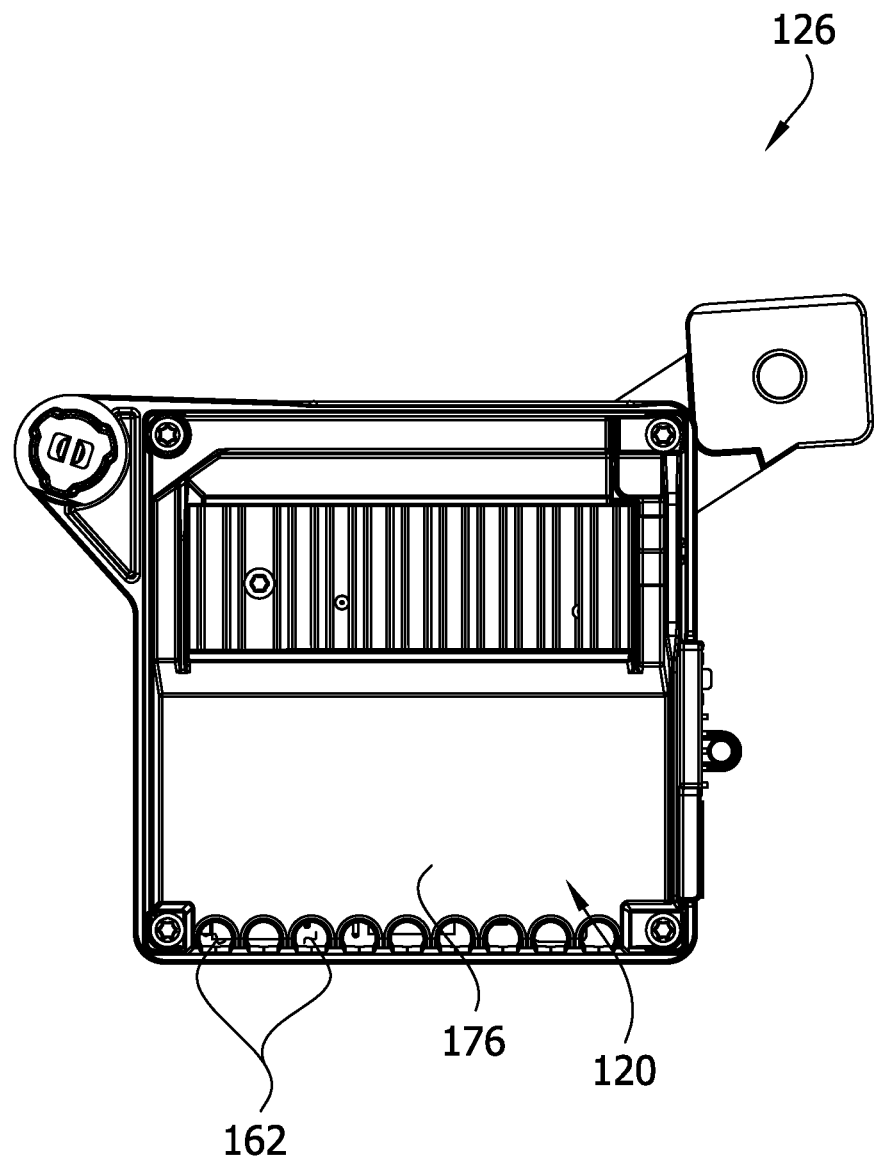
FIG. 12 is a front elevation of the system illustrated in FIG. 10.

Another embodiment of an integrated motor and motor control, generally designated 126, is illustrated in FIGS. 10-12. Except as noted, the system 126 illustrated in FIGS. 10-12 is substantially identical to the system 26 described above. The bottom of the housing 120 in this embodiment has a plurality of ventilation slots 162 instead of a single large ventilation opening 62, as described above. The slots 162 are positioned between finger guards 164. The purpose of the slots 162 is to provide ventilation for the housing 120 while the finger guards 164 are provided to limit the possibility that a person (e.g., an assembly line worker handing the integrated motor and motor control 126) will contact the motor control. The slots 162 extend along the bottom of the housing 120 and a short distance upward along the front side 176 of the housing. The housing 120 is shaped to funnel any liquid flowing along the front 176 of the housing toward the finger guards 164 and away from the slots 162. As illustrated in FIG. 11, for example, arcuate ridges 166 on the housing extend the slots 162. Adjacent ridges 166 cooperatively funnel liquid on the front 176 of the housing toward the finger guards 164. Sharp edges 168 are formed where the finger guards 164 intersect the front 176 of the housing 120 so any liquid flowing down the front 176 of the housing is funneled by the ridges 166 to the sharp edges 168 where it drips off the housing.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An integrated motor and control system comprising:
   an electric motor;
   a control for controlling operation of the motor; and
   a housing substantially covering at least two sides of the control, said housing including a protruding portion, an opening and a liquid guide shaped for guiding liquid toward one or more positions in the opening when the system is oriented so the liquid guide is above the opening and the protruding portion is below the opening; and
   a heat sink mounted on the control for cooling the control, the heat sink extending through the opening,
   the heat sink being shaped so liquid guided by the liquid guide to said one or more positions in the opening is shed away from the opening toward the protruding portion of the housing by the heat sink to limit contact between the control and the liquid when the system is oriented so the liquid guide is above the opening,
   said control being mounted on at least one of the electric motor and the housing.

2. A motor and control system as set forth in claim 1 wherein:
   the heat sink includes fins separated by open spaces; and
   said liquid guide guides liquid toward at least one of the spaces.

3. A motor and control system as set forth in claim 2 wherein said fins extend generally vertically for directing liquid downward from the liquid guide.

4. A motor and control system as set forth in claim 2 wherein:
   said fins extend from a base surface of the heat sink; and
   said liquid guide guides liquid to a position spaced from the base surface.

5. A motor and control system as set forth in claim 1 wherein the protruding portion of the housing includes a sloped top surface for directing liquid away from the motor and control.

6. A motor and control system as set forth in claim 5 wherein the housing further comprises a rib projecting from the housing and extending along a side edge of the housing to limit movement of liquid onto the side of the housing.

7. An integrated motor and control system comprising:
   an electric motor;
   a control mounted on the motor for controlling operation of the motor;
   a heat sink adjacent the control for cooling the control; and
   a housing substantially covering at least two sides of the control, said housing including an opening sized for exposing at least a portion of the heat sink to an environment outside the housing and liquid guide for guiding liquid toward the heat sink when the system is oriented so the liquid guide is above the opening,
   wherein the housing includes a protruding portion positioned below the opening; and
   said heat sink directs liquid toward the protruding portion.

8. A motor and control system as set forth in claim 7 wherein:
   the heat sink includes fins separated by open spaces; and
   said liquid guide guides liquid toward at least one of the spaces.

9. A motor and control system as set forth in claim 8 wherein said fins extend generally vertically for guiding liquid downward from the liquid guide.

10. A motor and control system as set forth in claim 9 wherein:
    said fins extend from a base surface of the heat sink; and
    said liquid guide guides liquid to a position spaced from the base surface.

11. A motor and control system as set forth in claim 7 wherein the protruding portion of the housing includes a sloped top surface for directing liquid away from the motor and control.

12. An appliance comprising:
    a rotatably mounted drum;
    an electric motor operatively connected to the drum for rotating the drum;
    a control mounted on the motor for controlling operation of the motor;
    a housing substantially covering at least two sides of the control, said housing including an opening;
    a heat sink extending through the housing opening and mounted on the control for cooling the control; and
    a liquid guide extending along the housing for guiding liquid toward the opening and over the heat sink when the appliance is oriented so the liquid guide is above the opening,
    wherein the housing includes a protruding portion positioned below the opening and said heat sink directs liquid toward the protruding portion.

13. An appliance as set forth in claim 12 wherein:
    the heat sink includes fins separated by open spaces; and
    said liquid guide guides liquid toward at least one of the spaces.

14. An appliance as set forth in claim 13 wherein said fins extend generally downward for directing liquid from the liquid guide.

15. An appliance as set forth in claim 13 wherein:
    said fins extend from a base surface; and
    said liquid guide guides liquid to a position spaced from the base surface.

16. An appliance as set forth in claim 12 wherein the protruding portion of the housing includes a sloped top surface for directing liquid away from the motor and control.

17. An appliance as set forth in claim 12 wherein the housing further comprises a rib projecting from the housing and extending along a side of the housing to limit movement of liquid onto the side of the housing.

18. An appliance as set forth in claim 12 wherein the drum comprises a clothes washing machine drum.

19. An appliance as set forth in claim 12 wherein the axis of the motor is oriented substantially horizontally.

20. An appliance comprising:
    a rotatably mounted drum;
    an electric motor operatively connected to the drum for rotating the drum;
    a control mounted on the motor for controlling operation of the motor;
    a housing substantially covering at least two sides of the control, said housing having a front having an opening therein, a side, and a rib, the rib projecting from the front of the housing adjacent the side to limit movement of liquid from the front of the housing onto the side of the housing when the appliance is oriented so the rib is above the opening; and
    a heat sink extending through the housing opening and mounted on the control for cooling the control.

21. An appliance as set forth in claim 20 wherein the drum comprises a clothes washing machine drum.

22. An appliance as set forth in claim 20 wherein the axis of the motor is oriented substantially horizontally.

* * * * *